US010263911B2

(12) United States Patent
Xiang et al.

(10) Patent No.: US 10,263,911 B2
(45) Date of Patent: Apr. 16, 2019

(54) SYSTEM AND METHOD FOR RESOURCE MANAGEMENT (71) Applicant: Futurewei Technologies, Inc., Plano, TX (US)

(72) Inventors: Zhixian Xiang, Plano, TX (US); Jianning Liu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 184 days.

(21) Appl. No.: 15/144,629

(22) Filed: May 2, 2016

(65) Prior Publication Data
US 2016/0323200 A1 Nov. 3, 2016

Related U.S. Application Data (60) Provisional application No. 62/155,845, filed on May 1, 2015.

(51) Int. Cl.
*H04L 12/911* (2013.01)
*H04L 12/24* (2006.01)
*G06F 9/455* (2018.01)

(52) U.S. Cl.
CPC ........ *H04L 47/781* (2013.01); *G06F 9/45558* (2013.01); *H04L 41/0823* (2013.01); *H04L 41/0896* (2013.01)

(58) Field of Classification Search
CPC ............... H04L 41/0896; H04L 47/781; H04L 41/0823; H04W 24/02; G06F 9/45558
See application file for complete search history.

(56) References Cited

U.S. PATENT DOCUMENTS 8,219,807 B1 * 7/2012 Danoyan ............. G06F 21/6281
713/167
9,847,915 B2 * 12/2017 Ashwood-Smith ..... H04L 49/70
(Continued)

FOREIGN PATENT DOCUMENTS

CN 104219127 A 12/2014
EP 3198797 A1 8/2017
(Continued)

OTHER PUBLICATIONS

"Network Functions Virtualisation (NFV); Management and Orchestration" group specification; Network Functions Virtualisation (NFV) ETSI Industry Specification Group (ISG); ETSI GS NFV-MAN001 V1.1.1 (Dec. 2014), total 184 pages.
(Continued)

*Primary Examiner* — Aftab N. Khan
(74) *Attorney, Agent, or Firm* — Futurewei Technologies, Inc.

(57) ABSTRACT

System and method for resource management are disclosed. These include receiving, by a virtualized network function (VNF) manger (VNFM) entity, from a network functions virtualization orchestrator (NFVO) entity a granting indication including a granting granularity in which the NFVO entity permits the VNFM entity to perform multiple VNF management operations for one or more VNFs, determining, by the VNFM entity, that a first VNF management operation is in a scope of permission based on the granting indication upon the first VNF management operation being triggered, and sending, by the VNFM entity, a first resource allocation request for the first VNF management operation to a virtual infrastructure manager (VIM) entity.

18 Claims, 10 Drawing Sheets

(56) References Cited

U.S. PATENT DOCUMENTS

| | | | |
|---|---|---|---|
| 2004/0210623 A1 | 10/2004 | Hydrie et al. | |
| 2008/0155208 A1* | 6/2008 | Hiltgen | G06F 9/45533 |
| | | | 711/154 |
| 2014/0201374 A1 | 7/2014 | Ashwood-Smith et al. | |
| 2014/0317261 A1 | 10/2014 | Shatzkamer et al. | |
| 2017/0017512 A1* | 1/2017 | Csatari | G06F 9/4856 |
| 2017/0048165 A1* | 2/2017 | Yu | H04L 47/82 |
| 2017/0150399 A1* | 5/2017 | Kedalagudde | H04W 28/08 |
| 2017/0257276 A1* | 9/2017 | Chou | H04L 41/0823 |

FOREIGN PATENT DOCUMENTS

| | | |
|---|---|---|
| RU | 2382398 C2 | 2/2010 |
| WO | 2016048430 A1 | 3/2016 |

OTHER PUBLICATIONS

International Search Report issued in corresponding PCT application No. PCT/CN2016/080906, dated Jul. 25, 2016, total: 11 pages.

\* cited by examiner

SYSTEM AND METHOD FOR RESOURCE MANAGEMENT

The present application claims priority to U.S. Provisional Patent Application No. 62/155,845, filed May 1, 2015 and entitled "System and Method for VNFM and NFVO Resource Management Negotiation and Indication," which is incorporated herein by reference as if reproduced in its entirety.

TECHNICAL FIELD

The present disclosure relates to telecommunications, and, in particular embodiments, to methods and system for resource management in a network function virtualization (NFV) system.

BACKGROUND

Network Function Virtualization (NFV) is an industry effort to transform the way that network operators architect networks by evolving standard IT virtualisation technology to consolidate many network equipment types onto industry standard high volume servers, switches and storage, with the goal of cost reduction and efficient network operation and performance. In non-virtualised networks, network functions (NFs) are implemented as a combination of vendor specific software and hardware. By contrast, in NFV environment, NFs are separated from the hardware they run on using virtual hardware abstraction to virtualize entire classes of NFs into building blocks that may be connected, or chained, together to create communication services.

SUMMARY

In one embodiment, a method for resource management is disclosed that includes receiving, by a virtualized network function (VNF) manger (VNFM) entity, from a network functions virtualization orchestrator (NFVO) entity a granting indication including a granting granularity in which the NFVO entity permits the VNFM entity to perform multiple VNF management operations for one or more VNFs, determining, by the VNFM entity, that a first VNF management operation is in a scope of permission based on the granting indication upon the first VNF management operation being triggered, and sending, by the VNFM entity, a first resource allocation request for the first VNF management operation to a virtual infrastructure manager (VIM) entity.

In another embodiment, a system is disclosed that includes a memory storage that stores instructions and one or more processors in communication with the memory that execute the instructions. The instructions are executed to receive from a network functions virtualization orchestrator (NFVO) entity a granting indication including a granting granularity in which the NFVO entity permits a virtualized network function (VNF) manger (VNFM) entity to perform multiple VNF management operations for one or more VNFs, determine that a first VNF management operation is in a scope of permission based on the granting indication upon the first VNF management operation being triggered, and send a first resource allocation request for the first VNF management operation to a virtual infrastructure manager (VIM) entity.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Figure 1:
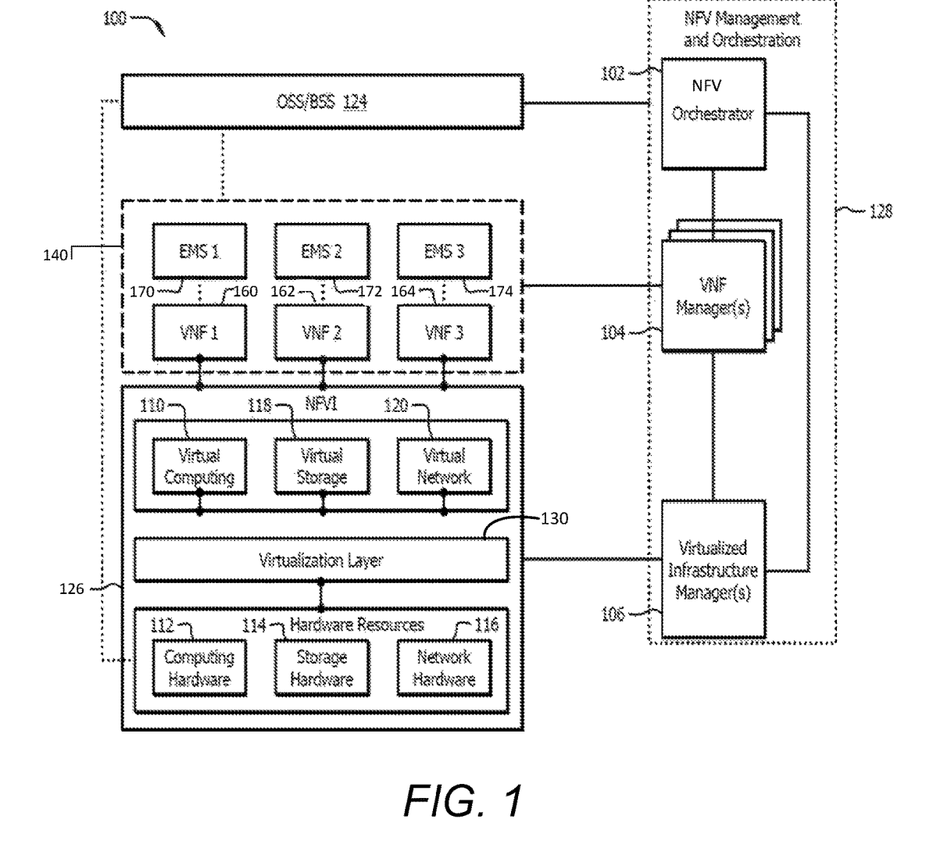
FIG. 1 illustrates a schematic diagram of an embodiment of an NFV system.

FIG. 1 is a schematic diagram of an embodiment of an NFV system 100. Some of this system is described in Network Functions Virtualization (NFV): Management and Orchestration (NFV-MANO), ETSI NFV-MAN 001 v1.1.1 (2014-12), http://www.etsi.org/deliver/etsi_gs/NFV-MAN/001_099/001/01.01.01_60/gs_NFV-MAN001v010101p.pdf, which is hereby incorporated into this application in its entirety by reference. The NFV system 100 may comprise an NFV Management and Orchestration (NFV-MANO) entity 128, an NFV Infrastructure (NFVI) entity 126, a virtual function entity 140, and one or more Operations Support Systems (OSSs) and Business Support Systems (BSSs) (OSS/BSS) 124. The virtual function entity 140 may comprise a plurality of virtual network function (VNF) elements 160, 162, and 164, a plurality of element management system (EMS) elements 170, 172, and 174 that can be configured to perform the typical management functionality for the plurality of VNF elements 160, 162, and 164. In the While three (3) VNF and EMS elements are shown in FIG. 1, it is expressly contemplated that any number of these elements may be found in a system, and the selection of three is purely for the purpose of convenience. Moreover, it is understood that alternate configurations are contemplated by this disclosure, e.g., where a plurality of VNF elements 160, 162, and 164 are controlled by a single EMS.

The VNF elements are used to perform a virtualisation of a network function in a non-virtualised network. For example, the network functions in the non-virtualised network may be 3GPP Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. For example, VNF 160 can be composed of one or more internal components, called virtualised network function components (VNFCs). Each VNFC provides a defined sub-set of that VNF's functionality, with the main characteristic that a single instance of this component maps 1:1 against a single virtualisation container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFV-MANO entity 128 may be responsible for the operation, management, and coordination of VNF elements 160, 162, and 164 and the respective NFVI entity 126. The NFV-MANO entity 128 may comprise an NFV Orchestrator (NFVO) entity 102, one or more VNF manager (VNFM) entities 104, and one or more Virtualized Infrastructure Manager (VIM) entities 106. The NFVO entity 102 can manage the network service (NS) lifecycle and coordinates the management of NS lifecycle, VNF lifecycle (supported by the VNFM entity 104) and NFVI resources (supported by the VIM entity 106) to ensure an optimized allocation of the necessary resources and connectivity. The VNFM entity 104 may communicate with VNF elements 160, 162, and 164 and be responsible for VNF lifecycle management (e.g. instantiation, update, query, scaling, and termination). For example, in one embodiment a VNFM entity 104 may be deployed for each VNF elements 160, 162, and 164. In other embodiments, a VNFM entity 104 may serve multiple VNF elements 160, 162, and 164. The VIM entity 106 can be responsible for controlling and managing the NFVI compute, storage and network resources. In other words, the VIM entity 106 may be configured to control and manage the interaction of a VNF with the compute, storage and network resources in NFVI entity 126. For example, the VIM entity 106 may perform resource management functions, such as management of infrastructure resource and allocation (e.g. increase resources to VMs, improve energy efficiency, and resource reclamation). The VIM entity 106 and the VNFM entity 104 may communicate with each other for resource allocation requests and to exchange virtualized hardware resource configuration and state information.

The NFVI entity 126 represents various hardware and software components which build up the environment in which VNFs are deployed, managed and executed. For example, the hardware components in the NFVI entity 126 may include computing hardware 112, storage hardware 114, and network hardware 116 that provide processing, storage and connectivity to VNF entities 160, 162, and 164 through a virtualization layer 130. The computing hardware 112 may be any device configured to, designed to, or otherwise enabled to provide processing and computing resources. The storage hardware 114 may be any kind of device which is used to store information for later retrieval. Examples of storage devices include flash memory, magnetic rotation disks, optical disks, or any other mechanism capable of storing information for later retrieval. Storage hardware 114 may be differentiated between shared network attached storage (NAS) and local storage that is connected directly to the NFVI using an internal bus or other attachment mechanism. In one embodiment, the resources from the computing hardware 112 and storage hardware 114 may be pooled together. The network hardware 116 may be switches that is configured to perform switching functions, e.g. routers, and wired or wireless links. The network hardware 116 may span across a plurality of network domains.

The virtualization layer 130 within the NFVI entity 126 may abstract the hardware resources, i.e., computing hardware 112, storage hardware 114, and network hardware 116 and decouple one or more of the VNF elements 160, 162, and 164 from the underlying hardware. For example, the virtualization layer 130 may be responsible for abstracting and logically partitioning hardware resources, enabling the software that implements the VNF to use the underlying virtualized infrastructure, and providing virtualized resources to the VNF entity. The virtualized resources controlled by the Virtualization Layer 130 may include a virtual computing 110, a virtual storage 118, and a virtual network 120.

Figure 2:
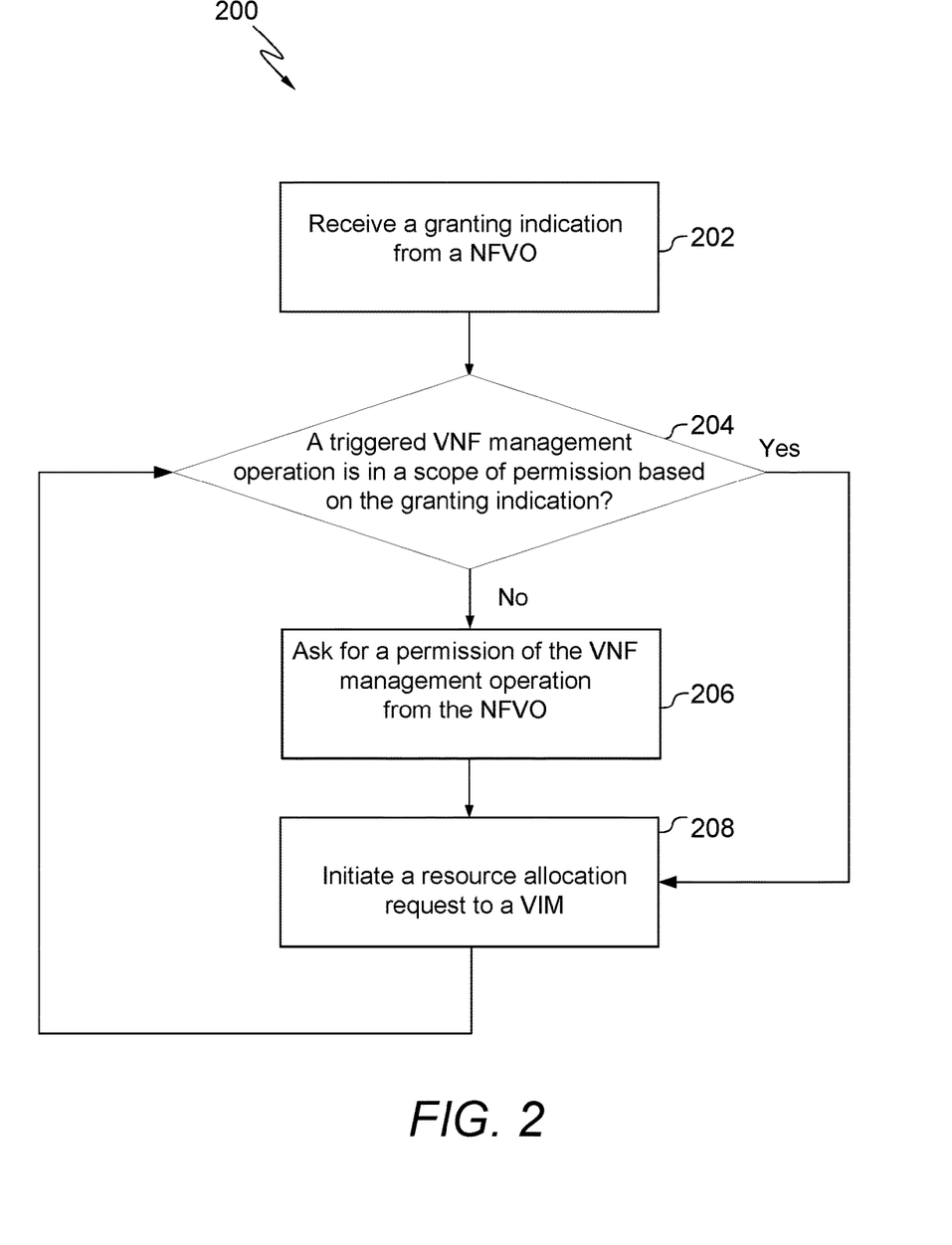
FIG. 2 illustrates a flow diagram of an embodiment of a method for resource management.

FIG. 2 illustrates a flow diagram of an embodiment of a method 200 for resource management. For example, the embodiment method 200 may be implemented in the context of the NFV system as illustrated in FIG. 1.

At step 202, a network node, for example, a VNFM entity receives a granting indication from a NFVO entity. The granting permission may be a message from a NFVO entity used to define permissions for the VNFM entity thereby defining, in some embodiments, functionality for the VNFM entity. In some embodiments, may be used to indicate that the NFVO entity permits the VNFM entity to perform multiple VNF management operations for one or multiple VNFs (for illustrative purposes as shown in FIG. 1 as VNF entities 160, 162, and 164) without asking explicit permission from the NFVO entity each time one of the multiple operations is to be performed. In addition, in some implementations, the granting indication may further indicate a constraint or condition allowed for the one or multiple VNFs. It is understood that the multiple VNF management operations permitted by the NFVO entity may be multiple operations which are of the same type or different types. It is understood that in some implementations the granting indication can also be modified as a non-granting indication indicating that each VNF management operation to be performed needs to receive explicit permission from the NFVO entity.

It is also understood that the VNF management operations is intended to include, but not be limited to, VNF-related management operations. For example, the VNF management operations may comprise VNF lifecycle management (LCM) operations, i.e., all operations needed to request and manage associations of NFVI Resources to a VNF, and maintain such associations in conformance with the VNF Descriptor and authorized run-time changes, throughout the lifecycle of the VNF. The VNF lifecycle management (LCM) operations may comprise different types of operations (e.g., instantiating, scaling, updating, upgrading or terminating operations).

In one example embodiment, the granting indication may include a granting granularity in which the NFVO entity permits the VNFM entity to perform multiple VNF management operations for one or more VNFs. In some implementations, the types of the granting granularity described below fall into three types which may be used alone or in combination with one another.

The first type of the granting granularity is an operation granularity. The operation granularity indicates which type of VNF management operation the VNFM entity is permitted to conduct with the VIM entity without asking explicit permission from the NFVO entity each time the type of VNF management operation is to be performed.

The second type of the granting granularity is a VNF granularity. The VNF granularity indicates that the VNFM entity is permitted to conduct all VNF management operations of a specific VNF or group of VNFs with the VIM entity without asking explicit permission from the NFVO entity each time one of the operations is to be performed.

The third type of the granting granularity is a VNFM granularity. The VNFM granularity indicates that the VNFM entity is permitted to conduct all VNF management operations of VNFs that are managed by this VNFM entity without asking explicit permission from the NFVO entity each time one of the operations is to be performed.

In some implementations where three types of granting granularity are used in combination with one another, the granting granularity may indicate the one or more VNFs permitted to the VNFM entity and the multiple VNF management operations granted for each of the permitted one or more VNFs.

In one example embodiment, the granting indication may further include a constraint or condition. The constraint or condition in which the NFVO entity allows the VNFM entity to conduct VNF management operation may be allowed for one or more VNFs. When the condition is not met or the constraint is not reached, the VNFM entity needs to get permission from the NFVO entity to conduct each VNF management operation with the VIM entity. The constraint, for example, may be a capacity related constraint, performance related constraint, or operation status related constraint.

While not shown in FIG. 2, it is explicitly understood that, in some embodiments, receiving the granting indication at step 202, the VNFM entity may further send a request for the granting indication to the NFVO entity. Therefore, the receipt of a granting indication from a NFVO 202 may be in response to a request which is not explicitly illustrated.

At step 204, the VNFM entity checks whether a VNF management operation is in a scope of permission based on the granting indication when the VNF management operation is triggered. If no, in step 206, the VNFM entity asks for a permission of the VNF management operation from the NFVO entity. Then in step 208, the VNFM entity initiates a resource allocation request for the VNF management operation to a VIM entity. If yes, then the method process skips to step 208 and the VNFM entity then initiates a resource allocation request to a VIM entity for the VNF management operation without asking for the permission. For the initiation of the resource allocation request, in some implementations, the VNFM entity may directly send the resource allocation request to the VIM entity. The resource allocation request is received by the VIM entity from the VNFM entity without going through the NFVO entity. In some implementations, the VNFM entity may send the resource allocation request to the NFVO entity and then the NFVO entity sends the resource allocation request to the VIM entity. It is understood that steps 204-208 may repeat for each of subsequent VNF management operation when triggered. For example, for each subsequent VNF management operation which is triggered, the VNFM entity may check whether it is in a scope of permission based on the granting indication and proceed accordingly. It is explicitly understood that another system, computer, or device may request permission to trigger the management operation in this, and other embodiments disclosed herein.

It is also understood that to the extent the term "indicate" is used in the specification or claims, it is intended to mean not only "explicitly indicate" but also "implicitly indicate". In this way, the indication may be positive (explicit), neutral (passive), or any other indication that access is not precluded. While this example shows a permissive system, whereby access is granted if not explicitly denied, it is understood that the systems and methods disclosed herein could be implemented using a non-permissive system where explicit permissions were required.

According to the embodiment of FIG. 2, as the VNFM entity does not have to send a request for permission to the NFVO entity for each VNF management operation to be performed, it can reduce a high traffic exchange between the VNFM entity and the NFVO entity during VNF management operations. The efficiency of interaction between the NFVO entity and the VNFM entity is improved. Meanwhile the risk of NFVO entity as a single point of failure is reduced and the VNFM's overall response time on VNF management operations is also reduced. Thus a more flexibility and intelligence system for resource management is provided.

Figure 3:
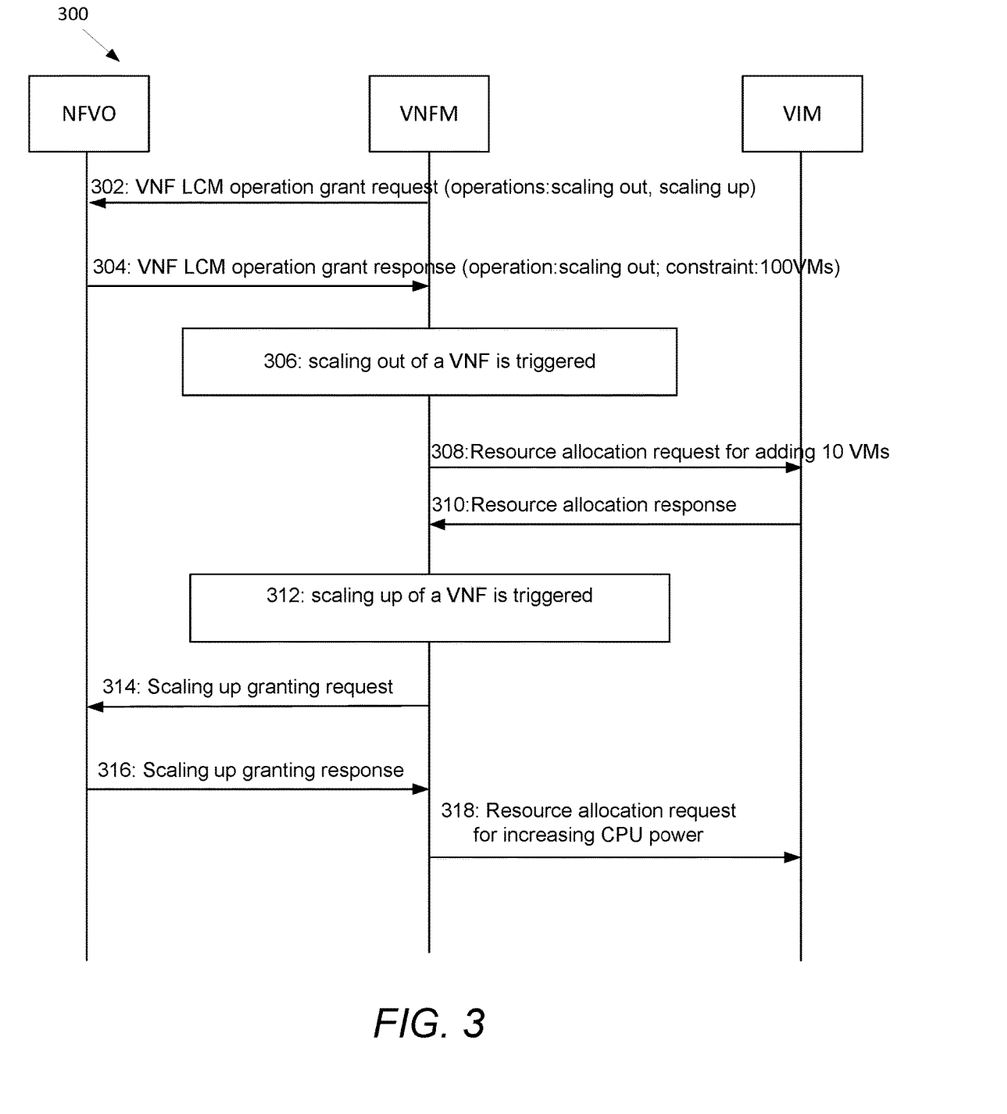
FIG. 3 illustrates a flow diagram of another embodiment of a method for resource management.

FIG. 3 illustrates a flow diagram of another embodiment of a method 300 for resource management. For example, the embodiment method 300 may be implemented in the context of the NFV system as illustrated in FIG. 1.

At step 302, a VNFM entity sends a VNF LCM operation grant request to a NFVO entity, to request the NFVO entity to permit the VNFM entity to perform multiple operations (for example, scaling out, scaling up operations) without asking explicit permission from the NFVO entity each time one of the multiple operations is to be performed. In some implementations, the VNF LCM operation grant request may include a VNFM capability indication. The VNFM capability indication indicates that the VNFM entity supports the capability to conduct the VNF LCM operation without obtaining permission from the NFVO entity for each VNF LCM operation.

At step 304, the NFVO entity sends a VNF LCM operation grant response to the VNFM entity. The grant response carries a granting indication which includes an operation granularity and a capacity related constraint. The operation granularity indicates the VNFM entity can conduct scaling out operations without asking explicit permission from the NFVO entity for each scaling out operation. The operation granularity also indicates the VNFM entity cannot conduct scaling up operations without asking explicit permission from the NFVO entity for each scaling up operation. The capacity related constraint can indicate a maximum permitted capacity for a VNF (e.g. 100 VMs), based on any number of factors including hardware limitations.

It is understood that the interaction about the indication and the capability may be implemented in any desired procedure or mechanism. For example, such interaction may be implemented during initial connection establishment between the VNFM entity and NFVO entity. The scaling ability may include scaling out ability to scale by add resource instances. In other cases, the scaling ability may include scaling up ability to scale by changing allocated resource, e.g. increase memory, CPU capacity/power or storage size.

At step 306, when scaling out of the VNF is triggered, the VNFM entity determines that the scaling out is in the scope of the permission based on the granting indication.

At step 308, the VNFM entity sends a resource allocation request for adding 10 VMs on the VNF to the VIM entity. While 10 VMs are mentioned in this embodiment, it is expressly contemplated that any suitable number of VMs may be implemented, and the selection of 10 VMs is purely for the purpose of illustration.

At step 310, the VIM entity sends a resource allocation response to the VNFM entity.

At step 312, when scaling up of the VNF is triggered, the VNFM entity determines that the scaling up is outside the scope of the permission based on the granting indication.

At step 314, the VNFM entity sends a scaling up granting request to ask explicit permission for this scaling up operation from the NFVO entity.

At step 316, the NFVO entity sends a scaling up granting response to grant this scaling up operation.

At step 318, the VNFM entity sends a resource allocation request for increasing CPU power for the VNF.

Figure 4:
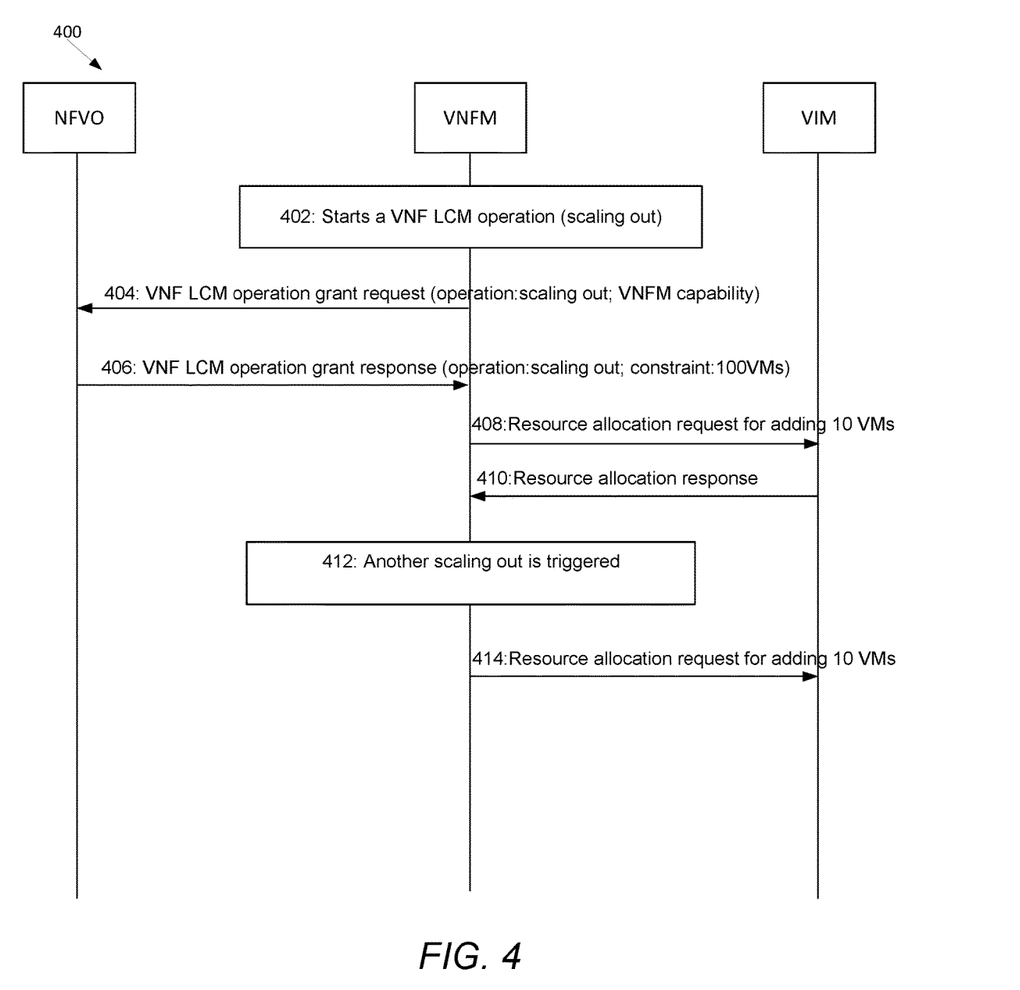
FIG. 4 illustrates a flow diagram of another embodiment of a method for resource management.

FIG. 4 illustrates a flow diagram of another embodiment of a method 400 for resource management. For example, the embodiment method 400 may be implemented in the context of the NFV system 100 as illustrated in FIG. 1.

At step 402, a VNFM entity starts a VNF LCM operation, for example, a scaling out operation.

At step 404, the VNFM entity sends a VNF LCM operation grant request to a NFVO entity, to request the NFVO entity to permit the VNFM entity to perform multiple scaling out operations without asking explicit permission from the NFVO entity each time one of the multiple operations is to be performed. In some implementations, the VNF LCM operation grant request may include a VNFM capability indication. The VNFM capability indication indicates that the VNFM entity supports the capability to conduct the VNF LCM operation without obtaining permission from the NFVO entity for each VNF LCM operation.

At step 406, the NFVO entity sends a VNF LCM operation grant response to the VNFM entity. The grant response carries a granting indication which includes an operation granularity and a capacity related constraint. The operation granularity indicates the VNFM entity is permitted to conduct scaling out operations without asking explicit permission from the NFVO entity for each scaling out operation. The capacity related constraint indicates a maximum permitted capacity (e.g. 90 VMs) for a VNF.

At step 408, the VNFM entity determines that the scaling out operation triggered is in the scope of the permission based on the granting indication, and then sends a resource allocation request for adding 10 VMs on the VNF to the VIM entity.

At step 410, the VIM entity sends a resource allocation response to the VNFM entity.

At step 412, when another scaling out operation is triggered, the VNFM entity determines that the another scaling out operation is in the scope of the permission based on the granting indication, and then perform step 414.

At step 414, the VNFM entity sends a resource allocation request for adding 10 VMs on the VNF to the VIM entity. While 10 VMs are mentioned in this embodiment, it is expressly contemplated that any suitable number of VMs may be implemented, and the selection of 10 VMs is purely for the purpose of illustration.

Figure 5:
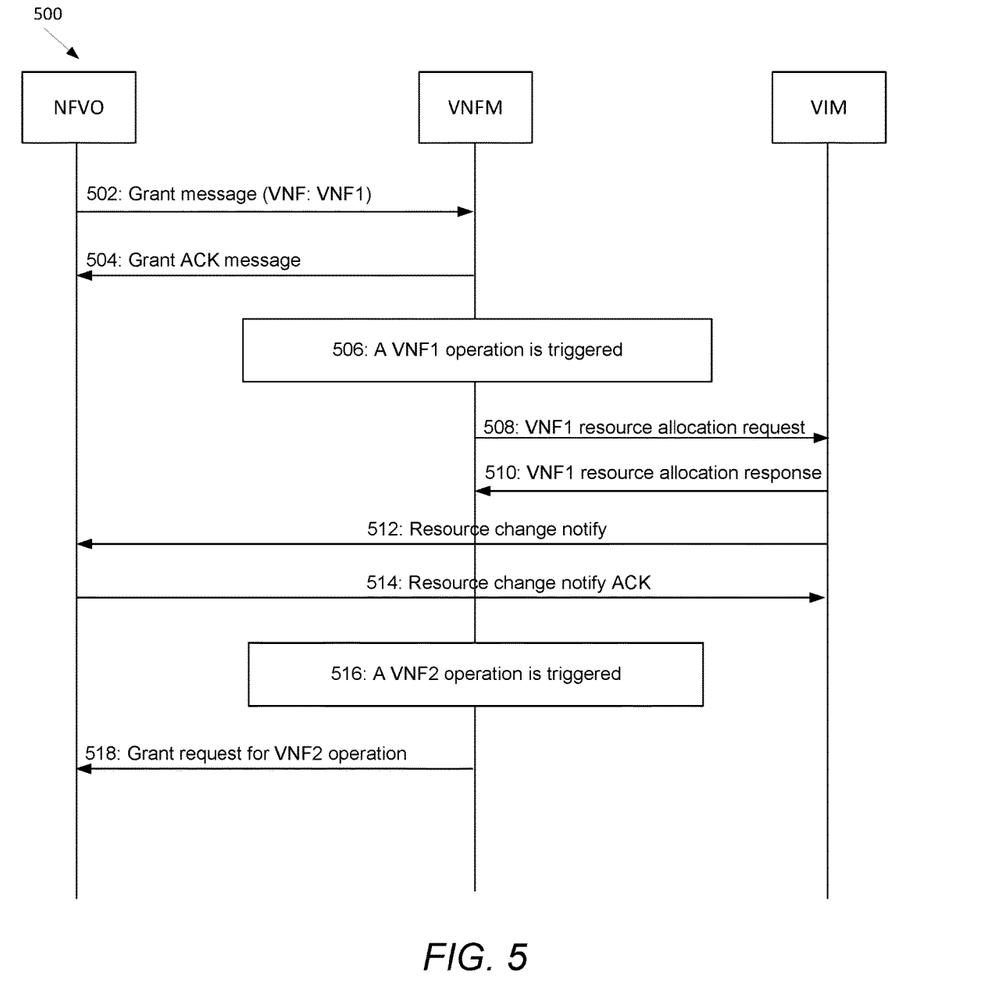
FIG. 5 illustrates a flow diagram of another embodiment of a method for resource management.

FIG. 5 illustrates a flow diagram of another embodiment of a method 500 for resource management. For example, the embodiment method 500 may be implemented in the context of the NFV system 100 as illustrated in FIG. 1.

At step 502, a NFVO entity sends to a VNFM entity a grant message. The grant message carries a granting indication including a VNF granularity. The VNF granularity indicates that the NFVO entity permits the VNFM entity to conduct all VNF management operations of VNF1 without asking explicit permission from the NFVO entity each time one of the operations is to be performed. For example, the VNF granularity may indicate the identifier of the granted VNF 1.

At step 504, the VNFM entity responds a grant ACK message.

At step 506, when a VNF1 management operation is triggered, the VNFM entity determines that the VNF1 operation is in the scope of the permission based on the granting indication, and then performs step 508. It is explicitly understood that another system, computer, or device may request permission to trigger the management operation in this, and other embodiments disclosed herein.

At step 508, the VNFM entity sends a VNF1 resource allocation request to a VIM entity.

At step 510, the VIM entity responds a VNF1 resource allocation response.

At step 512, the VNFM entity receives from the VIM entity a resource change notify message, and then send the resource change notify message to the NFVO entity. The resource change notify message, for example, may include information about consumed capacity during the VNF1 operation.

At step 514, the NFVO entity responds a resource change notify ACK to the VIM entity through the VNFM entity.

At step 516, when a VNF2 management operation is triggered the VNFM entity determines that the VNF2 operation is outside the scope of the permission based on the granting indication, and then performs step 518.

At step 518, the VNFM entity sends a grant request to the NFVO entity, to request explicit permission for the VNF2 operation from the NFVO entity.

Figure 6:
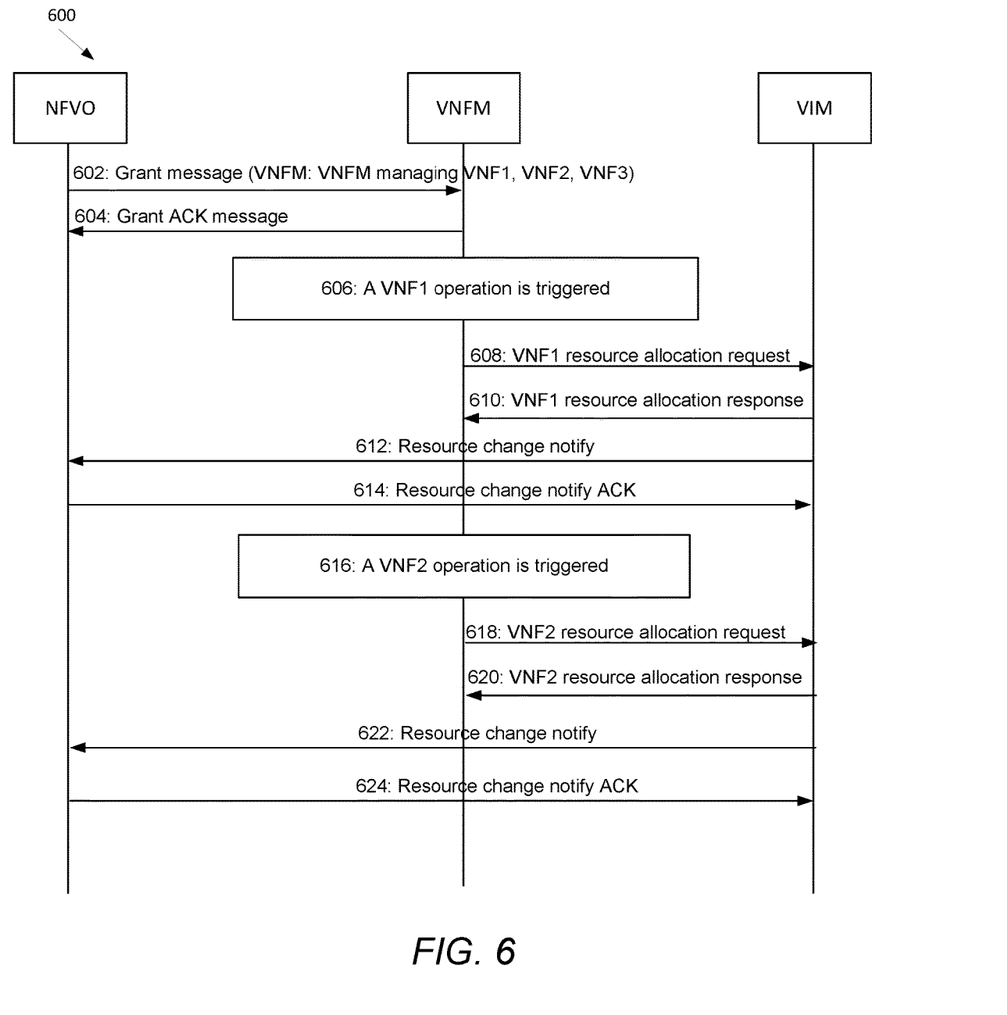
FIG. 6 illustrates a flow diagram of another embodiment of a method for resource management.

FIG. 6 illustrates a flow diagram of another embodiment of a method 600 for resource management. For example, the embodiment method 600 may be implemented in the context of the NFV system 100 as illustrated in FIG. 1.

At step 602, a NFVO entity sends to a VNFM entity a grant message. The grant message carries a granting indication including a VNFM granularity. The VNFM granularity indicates that the NFVO entity permits the VNFM entity to conduct all VNF management operations of VNFs (e.g. VNF1, VNF2 and VNF3) that are managed by the VNFM entity without asking explicit permission from the NFVO entity each time one of the operations is to be performed.

At step 604, the VNFM entity responds a grant ACK message.

At step 606, when a VNF1 management operation is triggered, the VNFM entity determines that the VNF1 operation is in the scope of the permission based on the granting indication, and then performs step 608.

At step 608, the VNFM entity sends a VNF1 resource allocation request to a VIM entity.

At step 610, the VIM entity responds a VNF1 resource allocation response.

At step 612, the VNFM entity receives from the VIM entity a resource change notify message, and then send the resource change notify message to the NFVO entity. The resource change notify message, for example, may include information about consumed capacity during the VNF1 operation.

At step 614, the NFVO entity responds a resource change notify ACK to the VIM entity through the VNFM entity.

At step 616, when a VNF2 management operation is triggered the VNFM entity determines that the VNF2 operation is also in the scope of the permission based on the granting indication, and then performs step 618.

At step 618, the VNFM entity sends a VNF2 resource allocation request to a VIM entity.

At step 620, the VIM entity responds a VNF2 resource allocation response.

At step 622, the VNFM entity receives from the VIM entity a resource change notify message, and then send the resource change notify message to the NFVO entity. The resource change notify message, for example, may include information about consumed capacity during the VNF2 operation.

At step 624, the NFVO entity responds a resource change notify ACK to the VIM entity through the VNFM entity.

Figure 7:
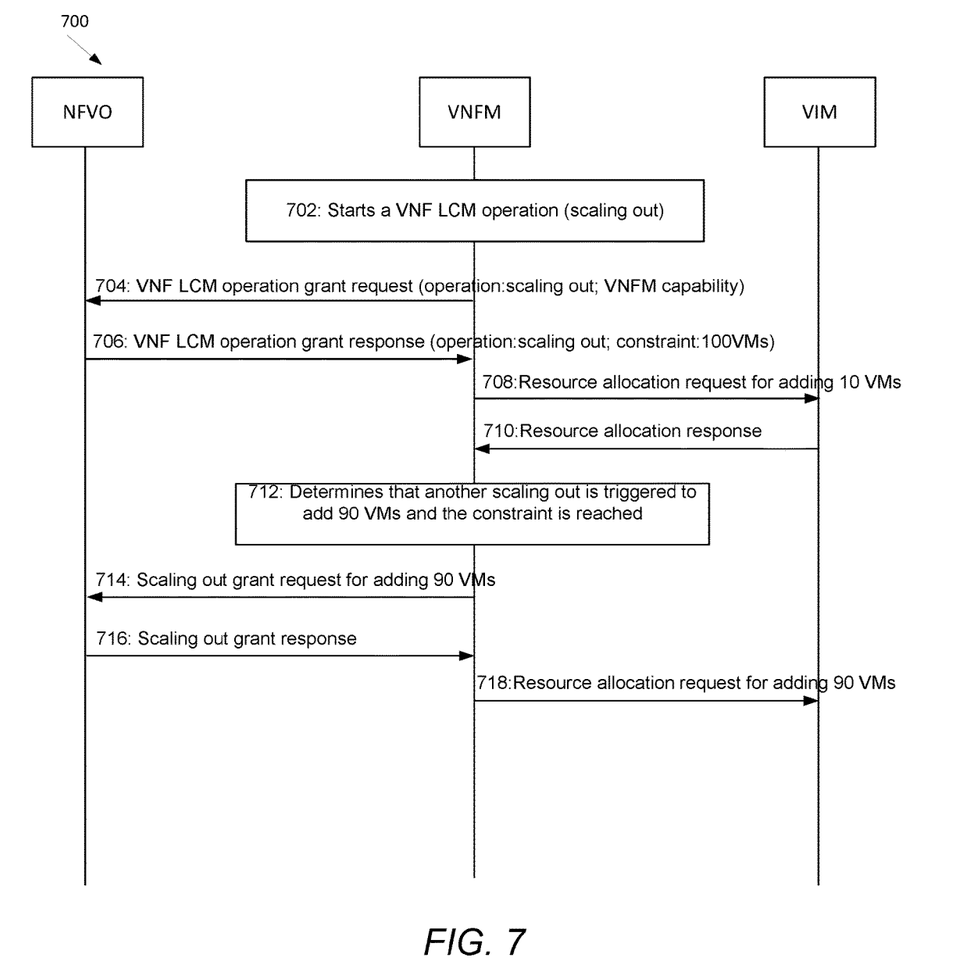
FIG. 7 illustrates a flow diagram of another embodiment of a method for resource management.

FIG. 7 illustrates a flow diagram of another embodiment of a method 700 for resource management. For example, the embodiment method 700 may be implemented in the context of the NFV system 100 as illustrated in FIG. 1.

At step 702, a VNFM entity starts a VNF LCM operation, for example, a scaling out operation.

At step 704, the VNFM entity sends a VNF LCM operation grant request to a NFVO entity, to request the NFVO entity to permit the VNFM entity to perform multiple scaling out operations without asking explicit permission from the NFVO entity each time one of the multiple operations is to be performed. In some implementations, the VNF LCM operation grant request may further include a VNFM capability indication. The VNFM capability indication indicates that the VNFM entity supports the capability to conduct the VNF LCM operation without obtaining permission from the NFVO entity for each VNF LCM operation.

At step 706, the NFVO entity sends a VNF LCM operation grant response to the VNFM entity. The grant response carries a granting indication which includes an operation granularity and a capacity related constraint. The operation granularity indicates the VNFM entity is permitted to conduct scaling out operations without asking explicit permission from the NFVO entity for each scaling out operation. The capacity related constraint indicates a maximum permitted capacity (e.g. 100 VMs) for a VNF.

At step 708, the VNFM entity determines that the triggered scaling out operation is in the scope of the permission based on the granting indication, and then sends a resource allocation request for adding 10 VMs on the VNF to the VIM entity. While 10 VMs are mentioned in this embodiment, it is expressly contemplated that any suitable number of VMs may be implemented, and the selection of 10 VMs is purely for the purpose of illustration.

At step 710, the VIM entity sends a resource allocation response to the VNFM entity.

At step 712, when another scaling out is triggered to add 90 VMs, the VNFM entity determines that the another scaling out operation is outside the scope of the permission based on the granting indication because the maximum permitted capacity for the VNF is reached.

At step 714, the VNFM entity sends to the NFVO entity a scaling out granting request for adding 90 VMs, to ask explicit permission for the scaling out operation (adding 90 VMs) from the NFVO entity.

At step 716, the NFVO entity sends a scaling out granting response to grant this scaling out operation (adding 90 VMs).

At step 718, the VNFM entity sends to the VIM entity a resource allocation request for adding 90 VMs.

Figure 8:
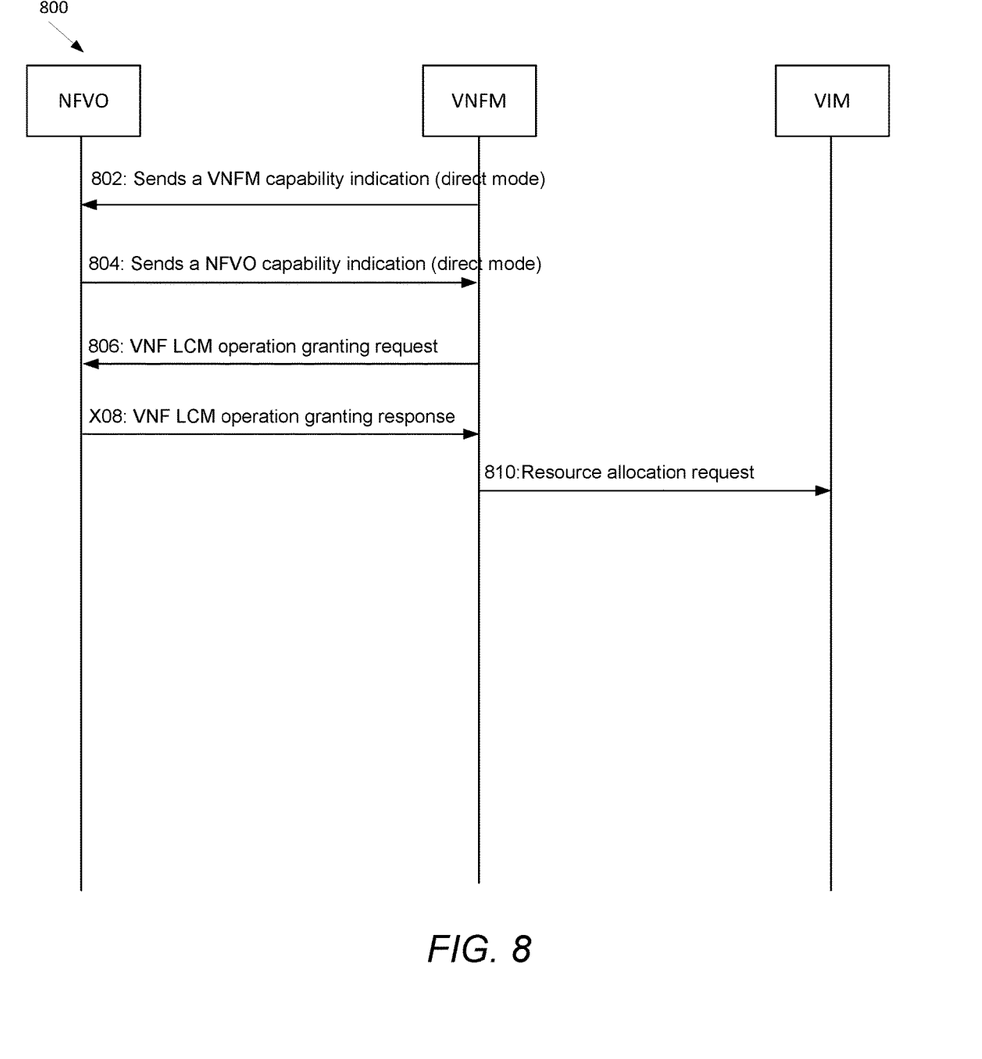
FIG. 8 illustrates a flow diagram of another embodiment of a method for resource management.

FIG. 8 illustrates a flow diagram of another embodiment of a method 800 for resource management. For example, the embodiment method 800 may be implemented in the context of the NFV system as illustrated in FIG. 1.

At step 802, a VNFM entity sends a VNFM capability indication to a NFVO entity. The VNFM capability indication indicates that the VNFM entity supports a capability to manage the virtualised resources needed for the lifecycle management of the VNF. In other words, the VNFM entity is capable to perform VNF-related resource management in direct mode, i.e., is capable to directly interact with a VIM entity for virtualised resource management.

At step 804, the NFVO entity sends a NFVO capability indication to the VNFM entity. The NFVO capability indication may indicate whether the NFVO entity supports a capability to manage the virtualised resources needed for the lifecycle management of the VNF. The NFVO capability indication may further indicate that the NFVO entity grants the VNFM entity to perform VNF-related resource management in direct mode.

At step 806, the VNFM entity sends to the NFVO entity a VNF LCM operation granting request, to ask permission for one or more VNF LCM operations from the NFVO entity.

At step 808, the NFVO entity responds a VNF LCM operation granting response to permit the VNFM entity to perform the one or more VNF LCM operations.

When VNF-related Resource Management in direct mode is applicable, for example, the VNFM entity may support the capability to request to the VIM entity the management of virtualised resources needed for VNFs instantiation, scaling and termination.

At step 810, the VNFM entity directly sends a resource allocation request to the VIM entity. The resource allocation request is received by the VIM entity from the VNFM entity without going through the NFVO entity. Thus the interaction about VNF-related resource management between the VNFM entity and the VIM entity needs not go through the NFVO entity.

Figure 9:
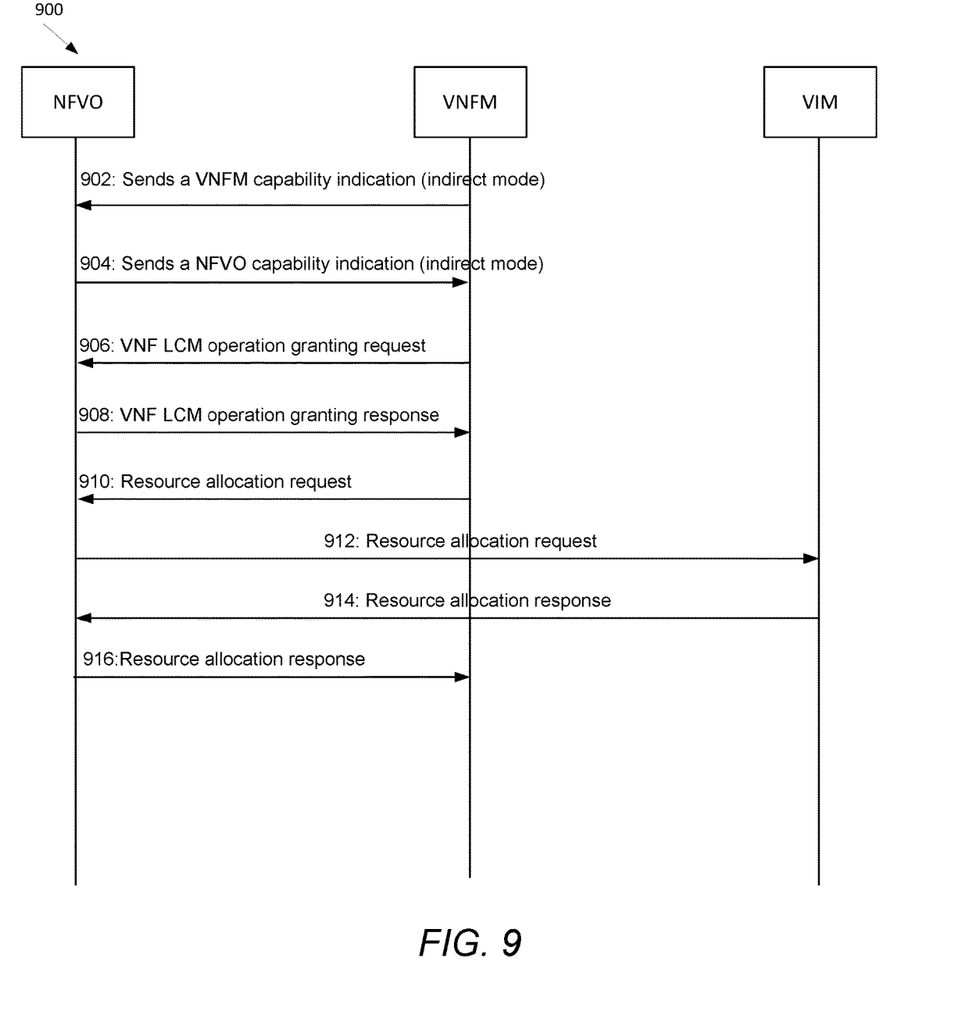
FIG. 9 illustrates a flow diagram of yet another embodiment of a method for resource management.

FIG. 9 illustrates a flow diagram of yet another embodiment of a method 900 for resource management. For example, the embodiment method 900 may be implemented in the context of the NFV system as illustrated in FIG. 1.

At step 902, a VNFM entity sends a VNFM capability indication to a NFVO entity. The VNFM capability indication indicates that the VNFM entity does not supports a capability to manage the virtualised resources needed for the lifecycle management of the VNF. In other words, the VNFM entity is capable to perform VNF-related resource management in indirect mode, i.e., is not capable to directly interact with a VIM entity for virtualised resource management.

At step 904, the NFVO entity sends a NFVO capability indication to the VNFM entity. The NFVO capability indication may indicate whether the NFVO entity supports a capability to manage the virtualised resources needed for the lifecycle management of the VNF. For example, the NFVO capability indication indicates that the NFVO entity supports a capability to manage the virtualised resources needed for the lifecycle management of the VNF. The NFVO capability indication may be used to further indicate that the NFVO entity grants the VNFM entity to perform VNF-related resource management in indirect mode.

At step 906, the VNFM entity sends to the NFVO entity a VNF LCM operation granting request, to ask permission for one or more VNF LCM operations from the NFVO entity.

At step 908, the NFVO entity responds a VNF LCM operation granting response to permit the VNFM entity to perform the one or more VNF LCM operations.

When VNF-related Resource Management in indirect mode is applicable, for example, the VNFM entity may support the capability to request to NFVO entity the management of virtualised resources needed for VNFs instantiation, scaling and termination. The NFVO entity may support the capability to invoke resource management operations toward the VIM entity as requested by the VNFM entity. The NFVO entity may also support the capability to request to the VIM entity the management of virtualised resources needed for VNFs instantiation, scaling and termination.

At step 910, the VNFM entity sends a resource allocation request to the NFVO entity.

At step 912, the NFVO entity sends the resource allocation request to the VIM entity.

At step 914, the VIM entity sends a resource allocation response to the NFVO entity.

At step 916, the NFVO entity sends the resource allocation response to the VNFM entity.

According to steps 910-916, the interaction about VNF-related resource management between the VNFM entity and the VIM entity has to go through the NFVO entity.

According to the embodiments of FIG. 8 and FIG. 9, through dynamic capability negotiation about modes of VNF-related Resource Management between the VNFM entity and the NFVO entity, a more flexible and efficient mechanism is provided to perform VNF-related Resource Management.

In one embodiment of the present disclosure, a system for resource management comprising means for receiving, by a virtualized network function (VNF) manger (VNFM) entity, from a network functions virtualization orchestrator (NFVO) entity a granting indication including a granting granularity in which the NFVO entity permits the VNFM entity to perform multiple VNF management operations for one or more VNFs is disclosed. This embodiment also includes means for determining, by the VNFM entity, that a first VNF management operation is in a scope of permission based on the granting indication upon the first VNF management operation being triggered and means for sending, by the VNFM entity, a first resource allocation request for the first VNF management operation to a virtual infrastructure manager (VIM) entity.

Figure 10:
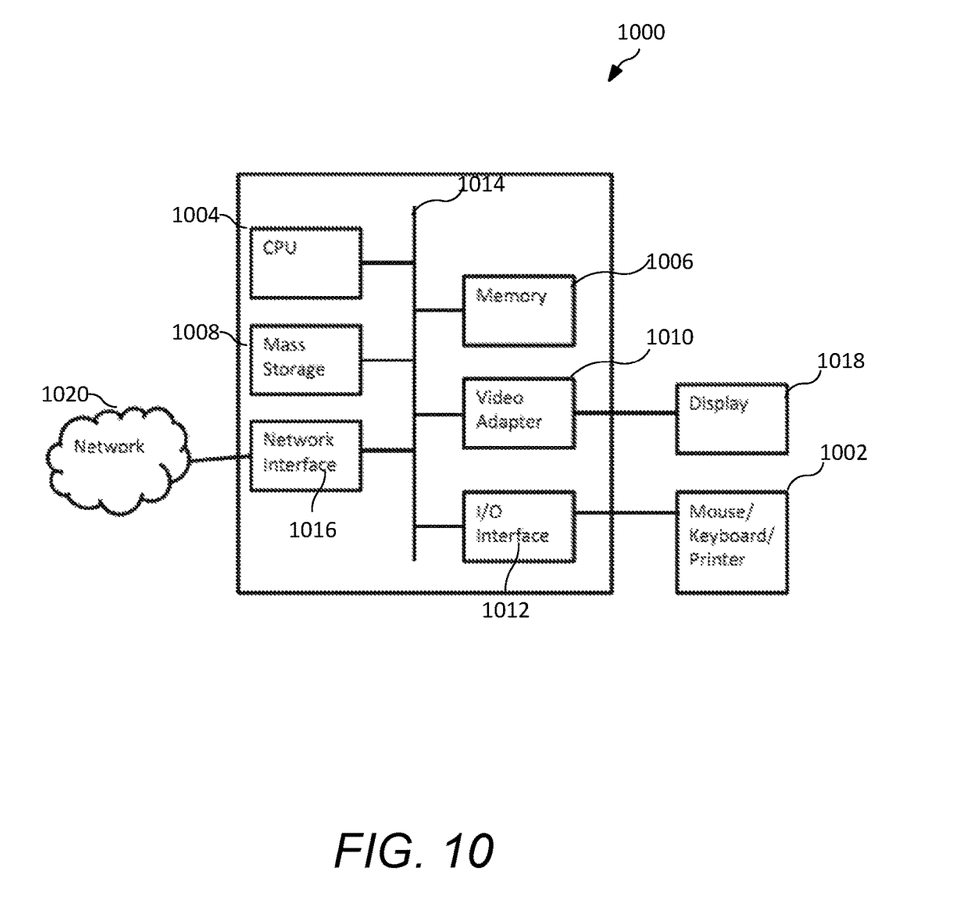
FIG. 10 illustrates a computing platform that may be used for implementing, for example, the devices and methods described herein, in accordance with an embodiment.

FIG. 10 is a block diagram of a processing system 1000 that may be used for implementing the devices and methods disclosed herein. System 1000 may be used in any hardware with functionality that is discussed in FIG. 1 or may be located in support functions (not shown). Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices 1002, such as a speaker, microphone, mouse, touchscreen, keypad, keyboard, printer, and the like. The processing unit may include a central processing unit (CPU) 1004, memory 1006, a mass storage device 1008, a video adapter 1010, and an I/O interface 1012 connected to a bus 1014.

The bus 1014 may be one or more of any type of several bus architectures including a memory bus or memory controller, a peripheral bus, video bus, or the like. The CPU 1004 may comprise any type of electronic data processor. The memory 1006 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1006 may include ROM for use at boot-up, and DRAM for program and data storage for use while executing programs.

The mass storage device 1008 may comprise any type of non-transitory storage device configured to store data, programs, and other information and to make the data, programs, and other information accessible via the bus. The mass storage device 1008 may comprise, for example, one or more of a solid state drive, hard disk drive, a magnetic disk drive, an optical disk drive, or the like.

The video adapter 1010 and the I/O interface 1012 provide interfaces to couple external input and output devices to the processing unit. As illustrated, examples of input and output devices include a display 1018 coupled to the video adapter 1010 and the mouse/keyboard/printer coupled to the I/O interface 1012. Other devices may be coupled to the processing system 1000, and additional or fewer interface devices may be utilized. For example, a serial interface such as Universal Serial Bus (USB) (not shown) may be used to provide an interface for a printer.

The processing system 1000 also includes one or more network interfaces 1016, which may comprise wired links, such as an Ethernet cable or the like, and/or wireless links to access nodes or different networks, illustrated in FIG. 10 as network 1020. The network interface 1016 allows the processing system 1000 to communicate with remote units via the networks. For example, the network interface 1016 may provide wireless communication via one or more transmitters/transmit antennas and one or more receivers/receive antennas. In an embodiment, the processing system 1000 is coupled to a local-area network or a wide-area network for data processing and communications with remote devices, such as other processing units, the Internet, remote storage facilities, or the like.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for resource management of a processing system comprising: receiving, by one or more processors, a virtualized network function manger (VNFM), from a network functions virtualization orchestrator (NFVO) a granting indication including a granting granularity in which the NFVO permits the VNFM to perform multiple subsequent virtualized network function (VNF) management operations for one or more VNFs without an explicit permission from the NFVO each time one of the multiple operations is to be performed;
wherein the NFV Orchestrator (NFVO), the VNF manager (VNFM), and the Virtualized Infrastructure Manager (VIM) are responsible for operation, management and coordination of the virtualized network function (VNF) of the processing system;
determining a scaling ability either scaling out or a scaling-up VNF management operation, when one of the VNF management operation is triggered, by the one or more processors of the VNFM of the processing system, that the VNF management operation is in a scope of permission based on the granting indication received in a request before the first VNF management operation is triggered, wherein grant request or response carries the granting indication operation granularity and a capacity related constraint; and
sending, by the one or more processors of the VNFM, a first resource allocation request for the first VNF management operation to a virtual infrastructure manager (VIM) wherein the scaling out ability adds resource instances and scaling up ability involve changing allocated resources that increase memory, CPU capacity or storage size.

2. The method of claim 1, wherein the granting granularity indicates the one or more VNFs permitted to the VNFM and the multiple VNF management operations granted for each of the permitted one or more VNFs.

3. The method of claim 2, wherein the one or more VNFs comprises a single VNF, group of VNFs or all VNFs belonging to the VNFM.

4. The method of claim 1, wherein the granting indication further comprises a constraint allowed by the NFVO for the one or more VNFs.

5. The method of claim 4, wherein the constraint comprises a permitted capacity.

6. The method of claim 5, wherein the method further comprises: sending, by the one or more processors of the VNFM, to the NFVO a notification message including a consumed capacity during the first VNF management operation.

7. The method of claim 1, wherein the first VNF management operation comprises a VNF lifecycle management (LCM) operation.

8. The method of claim 7, wherein the VNF LCM operation comprises instantiating, scaling, updating, upgrading or terminating operation.

9. A system for resource management of a processing system comprising:
central processing unit (CPU);
a memory storage comprising instructions; and
one or more processors of the processing system in communication with the memory, wherein the one or more processors execute the instructions to:
receive from a network functions virtualization orchestrator (NFVO) of the processing system a granting indication including a granting granularity in which the NFVQ permits a virtualized network function (VNF) manger (VNFM) to perform multiple subsequent VNF management operations for one or more VNFs without an explicit permission from the NFVO each time one of the multiple operations is to be performed;
wherein the NFV Orchestrator (NFVO), the VNF manager (VNFM), and the Virtualized Infrastructure Manager (VIM) are responsible for operation, management and coordination of the virtualized network function (VNF) of the processing system;
determine a scaling ability either scaling out or a scaling-up VNF management operation, when one of the VNF management operation is triggered, by the one or more processors of the VNFM of the processing system, that the VNF management operation is in a scope of permission based on the granting indication received in a request before the first VNF management operation is triggered, wherein grant request or response carries the granting indication operation granularity and a capacity related constraint; and
send a first resource allocation request for the first VNF management operation to a virtual infrastructure manager (VIM) wherein the scaling out ability adds resource instances and scaling up ability involve changing allocated resources that increase memory, CPU capacity or storage size.

10. The system of claim 9, wherein the one or more processors further execute the instructions to: determine upon a second VNF management operation is triggered, that the second VNF management operation is in the scope of the permission based on the granting indication received before the second VNF management operation is triggered without an explicit permission from the NFVO upon the second VNF management operation is triggered; and send a second resource allocation request for the second VNF management operation to the VIM.

11. The system of claim 9, wherein the one or more processors further execute the instructions to: determine upon a third VNF management operation is triggered, that the third VNF management operation is outside the scope of the permission based on the granting indication received before the third VNF management operation is triggered without an explicit permission from the NFVQ upon the third VNF management operation is triggered; and send a granting request for the permission of the third VNF management operation to the NFVQ.

12. The system of claim 9, wherein the granting granularity indicates the one or more VNFs permitted to the VNFM and the multiple VNF management operations granted for each of the permitted one or more VNFs.

13. The system of claim 12, wherein the one or more VNFs comprises a single VNF, group of VNFs or all VNFs belonging to the VNFM.

14. The system of claim 9, wherein the granting indication further comprises a constraint allowed by the NFVO for the one or more VNFs.

15. The system of claim 14, wherein the constraint comprises a permitted capacity.

16. The system of claim 15, wherein the one or more processors further execute the instructions to: send to the NFVO a notification message including a consumed capacity during the first VNF management operation.

17. The system of claim 9, wherein the first VNF management operation comprises a VNF lifecycle management (LCM) operation.

18. The system of claim 17, wherein the VNF LCM operation comprises instantiating, scaling, updating, upgrading or terminating operation.

* * * * *